US005995793A

United States Patent [19]

Enomoto et al.

[11] Patent Number: 5,995,793

[45] Date of Patent: *Nov. 30, 1999

[54] IMAGE FORMING APPARATUS AND METHOD FOR MANUFACTURING INTERMEDIARY TRANSFER BELT FOR IMAGE FORMING APPARATUS

[75] Inventors: Naoki Enomoto; Akihiko Takeuchi, both of Susono; Tatsuya Kobayashi, Sohka; Toshiaki Miyashiro, Shizuoka-ken, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,452

[22] Filed: Nov. 6, 1997

[30] Foreign Application Priority Data

Nov. 6, 1996 [JP] Japan .................................... 8-294225
Oct. 28, 1997 [JP] Japan .................................... 9-295525

[51] Int. Cl.[6] .............................. G03G 15/14; F16G 1/14

[52] U.S. Cl. .......................... 399/302; 156/137; 399/308

[58] Field of Search .................................... 399/298, 302, 399/307, 308; 156/137

[56] References Cited

U.S. PATENT DOCUMENTS

| | | | |
|---|---|---|---|
| 5,103,263 | 4/1992 | Moore et al. | 399/307 X |
| 5,132,743 | 7/1992 | Bujese et al. | 399/302 |
| 5,225,852 | 7/1993 | Uchida et al. | 346/134 |
| 5,298,956 | 3/1994 | Mammino et al. | 399/308 |
| 5,409,557 | 4/1995 | Mammino et al. | 156/137 |
| 5,508,796 | 4/1996 | Sasame et al. | 399/298 X |
| 5,600,420 | 2/1997 | Saito et al. | 399/302 |
| 5,666,597 | 9/1997 | Sasame et al. | 399/128 |
| 5,701,567 | 12/1997 | Bucks et al. | 399/302 |

FOREIGN PATENT DOCUMENTS

| | | |
|---|---|---|
| 57-23974 | 2/1982 | Japan . |
| 9-190090 | 7/1997 | Japan . |

*Primary Examiner*—Fred L Braun
*Attorney, Agent, or Firm*—Fitzpatrick, Cella, Harper & Scinto

[57] ABSTRACT

An image forming apparatus includes an image bearing member for bearing a toner image; a movable intermediary transfer belt extended around a plurality of supporting shafts, the intermediary transfer belt includes a core member and elastic layers sandwiching the core member, wherein a toner image on the image bearing member is transferred onto the intermediary transfer belt, and the toner image on the intermediary transfer belt is transferred onto a transfer material; wherein a distance r (mm) between a center of such one of the supporting shafts as has a minimum diameter and a center of the core member, a distance $L_1$ (mm) between the center of the core member and a surface of the intermediary transfer belt where toner image transfer occurs, a distance $L_2$ (mm) between a surface Of the core member and the surface of the intermediary transfer belt where the toner image transfer occurs, and a size t (mm) of the core member measured in a direction perpendicular to a movement direction of the intermediary transfer belt, satisfy:

$$L_1 \leqq 0.1r, \text{ and}$$

$$0.5t \leqq L_2.$$

A method for manufacturing the intermediary transfer belt is also a part of applicants improvement in the art to which the invention pertains.

60 Claims, 13 Drawing Sheets

| | T (mm) | $L_1$(mm) |
|---|---|---|
| ITB-a | 1.1 | 1.0 |
| ITB-b | 1.1 | 0.2 |
| ITB-c | 0.9 | 0.8 |
| ITB-d | 0.9 | 0.5 |
| ITB-e | 0.7 | 0.4 |
| ITB-f | 0.7 | 0.2 |
| ITB-g | 0.7 | 0.6 |

FIG. 13

| | GAP AT FLAT PORTION h(mm) | GAP AT MIN. SHAFT H (mm) | ELONGATION K (%) | IMAGE |
|---|---|---|---|---|
| ITB-a | 0.60 | 0.67 | 12 | NG |
| ITB-b | 0.60 | 0.61 | 2 | G |
| ITB-c | 0.61 | 0.67 | 10 | F |
| ITB-d | 0.60 | 0.64 | 6 | G |
| ITB-e | 0.59 | 0.62 | 5 | G |
| ITB-f | 0.61 | 0.62 | 2 | G |
| ITB-g | 0.60 | 0.64 | 7 | F |

NG: NO GOOD
F: PRACTICAL
G: NO DISTURBANCE

FIG. 14

| | $L_2$(mm) | t(mm) | $L_2$/t | IMAGE |
|---|---|---|---|---|
| ITB-p | 0.06 | 0.2 | 0.3 | NG |
| ITB-q | 0.15 | 0.2 | 0.7 | G |
| ITB-r | 0.10 | 0.2 | 0.5 | F |
| ITB-s | 0.34 | 0.3 | 1.1 | G |
| ITB-t | 0.10 | 0.3 | 0.3 | NG |
| ITB-u | 0.20 | 0.4 | 0.5 | F |
| ITB-v | 0.40 | 0.4 | 1.0 | G |

NG: TRACE OF CORE ON IMAGE
F: TRACE IS NO PRACTICAL PROBLEM
G: NO TRACE

FIG. 15

| | | COAT LAYER THICKNESS n | | | | |
|---|---|---|---|---|---|---|
| | | 5µ | 10µ | 20µ | 40µ | 60µ |
| RUPTURE ELONGATION p | 5% | 2% | 2% | 1% | 1% | 1% |
| | 10% | 2% | 2% | 2% | 1% | 1% |
| | 50% | 7% | 5% | 3% | 2% | 2% |
| | 100% | 10% | 7% | 5% | 3% | 3% |
| | 200% | 14% | 10% | 7% | 5% | 3% |
| | 300% | 20% | 14% | 10% | 7% | 5% |

FIG. 16

IMAGE FORMING APPARATUS AND METHOD FOR MANUFACTURING INTERMEDIARY TRANSFER BELT FOR IMAGE FORMING APPARATUS

FIELD OF THE INVENTION AND RELATED ART

Image forming apparatus and manufacturing method for an intermediary transfer belt usable therewith.

The present invention relates to an image forming apparatus such as a copying machine, a laser beam printer or the like and to a manufacturing method of an intermediary transfer belt usable therewith.

Various types of color image forming apparatus are used, including an electrophotographic type, a heat transfer type, an ink jet type or the like. Among them, the electrophotographic type is better in the image formation speed, the image quality, the quiet property or the like. The electrophotographic type is further classified into various types. For example, there are a superimposing development type wherein a color image constituted by different color toner images is formed on the photosensitive member surface and is then transferred altogether onto a transfer material, a superimposing transfer type wherein development-transfer cycle is repeated, and an intermediary transfer type wherein toner images are transferred sequentially onto an intermediary transfer member and then transferred altogether onto a transfer material. The intermediary transfer type is advantageous in that there is no liability of color mixture, that various transfer materials of different qualities and thicknesses are usable, or the like.

FIG. 11 shows a laser beam printer for full-color printing (four color) as an exemplary intermediary transfer type image forming apparatus.

In this Figure, a surface of a photosensitive drum (first image bearing member) 1 rotatable in the direction of arrow R1 is uniformly charged by a charger 2, and then is exposed to light by exposure means 3 in accordance with image information so that electrostatic latent image is formed. The electrostatic latent image is developed into a toner image by depositing the yellow toner by a yellow developing device 8 carried on a rotary 22. The toner image is transferred (primary transfer) through a primary transfer nip $N_1$ by application of a primary transfer bias to a primary transfer roller 10 from a primary voltage source 20 onto an intermediary transfer belt (second image bearing member) 9A extended around a plurality of supporting shafts (secondary transfer opposing roller 12, driving roller 15, tension roller 16) and rotating in the direction of arrow R9. After the primary transfer, the photosensitive drum 1 is cleaned by a cleaner 19 so that primary untransferred toner is removed from the surface thereof, and the charge is removed from the surface by a discharging 17.

The series of the image forming process including the charging, exposure, development, primary transfer, cleaning and discharging, is repeated for each of colors (magenta, cyan, black) contained in the developing devices 6, 7, 5, so that toner images are superimposed on the intermediary transfer belt 9A. The toner images on the intermediary transfer belt 9A are transferred (secondary transfer) all together onto the surface of the transfer material P through a secondary transfer nip $N_2$ by application of a secondary transfer bias to the secondary transfer roller 11 from a secondary voltage source 21.

The transfer material P carrying the four color unfixed toner image is fed into a fixing device (unshown), where the toner image is fixed thereon, so that image formation is completed.

On the other hand, after the secondary transfer, the intermediary transfer belt 9A is cleaned so that secondary untransferred toner is removed from the surface thereof by a cleaner 13, thus removing the charge from the surface by a discharging 14.

The intermediary transfer belt 9A is usually of resin film of PVdF, Nylon, PET, polycarbonate or the like having a thickness of 100–200 $\mu$m, a volume resistivity of $10^{11}$–$10^{16}$ ohm.cm approx. (resistance is controlled if desired), and the primary transfer roller 10 is of a resistance roller having a volume resistivity not more than $10^5$ ohm.cm. By using a thin film as the intermediary transfer belt 9A, a large electrostatic capacity such as several 100—several 1000 PF can be provided at the primary transfer nip $N_1$ to accomplish a stabilized transferring current.

In the secondary transfer, a secondary transfer opposing roller 12, as an opposite electrode, supplied with a proper bias or electrically grounded, is contacted to the back side of the intermediary transfer belt 9A, and the secondary transfer roller 11 is supplied with a bias voltage having a polarity opposite from that of the toner on the intermediary transfer belt 9A from the secondary voltage source 21.

As described in the foregoing, the use of the intermediary transfer belt 9A of resin film as the intermediary transfer member, is advantageous in the latitude of the arrangement and the separation property of the transfer material P after the secondary transfer (curvature separation is usable) over the use of an intermediary transfer roller.

However, the intermediary transfer belt 9A of the resin film has a drawback that durability is low because of the upper limit of the thickness thereof. Additionally, since the intermediary transfer belt 9A of the resin film is poor in flexibility, the central drop-out of transfer of the toner image tends to occur. In order to eliminate the drawback, there is a proposal of an image forming apparatus using an intermediary transfer belt of endless rubber belt including a core member in place of an intermediary transfer belt 9A of the resin film. It comprises an annular core member as a base member and rubber members at its front side and rear.

The intermediary transfer belt surface may be coated with a coating layer of a material having good parting property relative to the toner such as fluorine resin material or TEFLON resin material in order to improve the cleaning property for the secondary untransferred toner on the intermediary transfer belt of rubber. However, when such an intermediary transfer belt of rubber is used, an arcuate-curved portion is formed along the outer surface of the intermediary transfer belt at portions contacted to the supporting shafts of the secondary transfer opposing roller 12, driving roller 15, tension roller 16 or the like, with the result that intermediary transfer belt surface is elongated at the curved portions. This may disturb the toner image carried on the intermediary transfer belt surface with the result of image deterioration of the normal toner image (image) as shown at the right-hand side in FIG. 12.

When the intermediary transfer belt has a surface coating layer, the coating layer may be cracked by the elongation of the surface at the curved portion so that separation is promoted, and therefore, the parting property relative to the toner is deteriorated. When the core member is disposed adjacent the surface of the intermediary transfer belt, a trace of the core member appears on the intermediary transfer belt surface, and the trace appears on the image with the result of deterioration of the image quality.

SUMMARY OF THE INVENTION

Accordingly, it is a principal object of the present invention to provide an image forming apparatus wherein deterioration of the toner image due to elongation of the intermediary transfer belt is prevented.

It is another object of the present invention to provide an image forming apparatus wherein deterioration of the image quality resulting from the influence of the trace of the core member of the intermediary transfer belt against the image, is prevented.

It is a further object of the present invention to provide a method of manufacturing an intermediary transfer belt including a core member and an elastic layer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 13 shows thicknesses T of 7 ITBs (intermediary transfer belts) and a distance $L_1$.

FIG. 14 shows a relation between the elongations of the ITB and the disturbance of the image.

FIG. 15 shows the distance $L_2$ of 7 ITBs, the size of the core member t, $L_2$/t and image evaluation.

FIG. 16 shows a relation between the rupture elongation p of ITB and a coating layer thickness n.

DETAILED DESCRIPTION OF THE PREFERRED EMBODIMENTS

Hereinafter, preferred embodiments of the present invention will be described with reference to the drawings.

Embodiment 1

Figure 1:
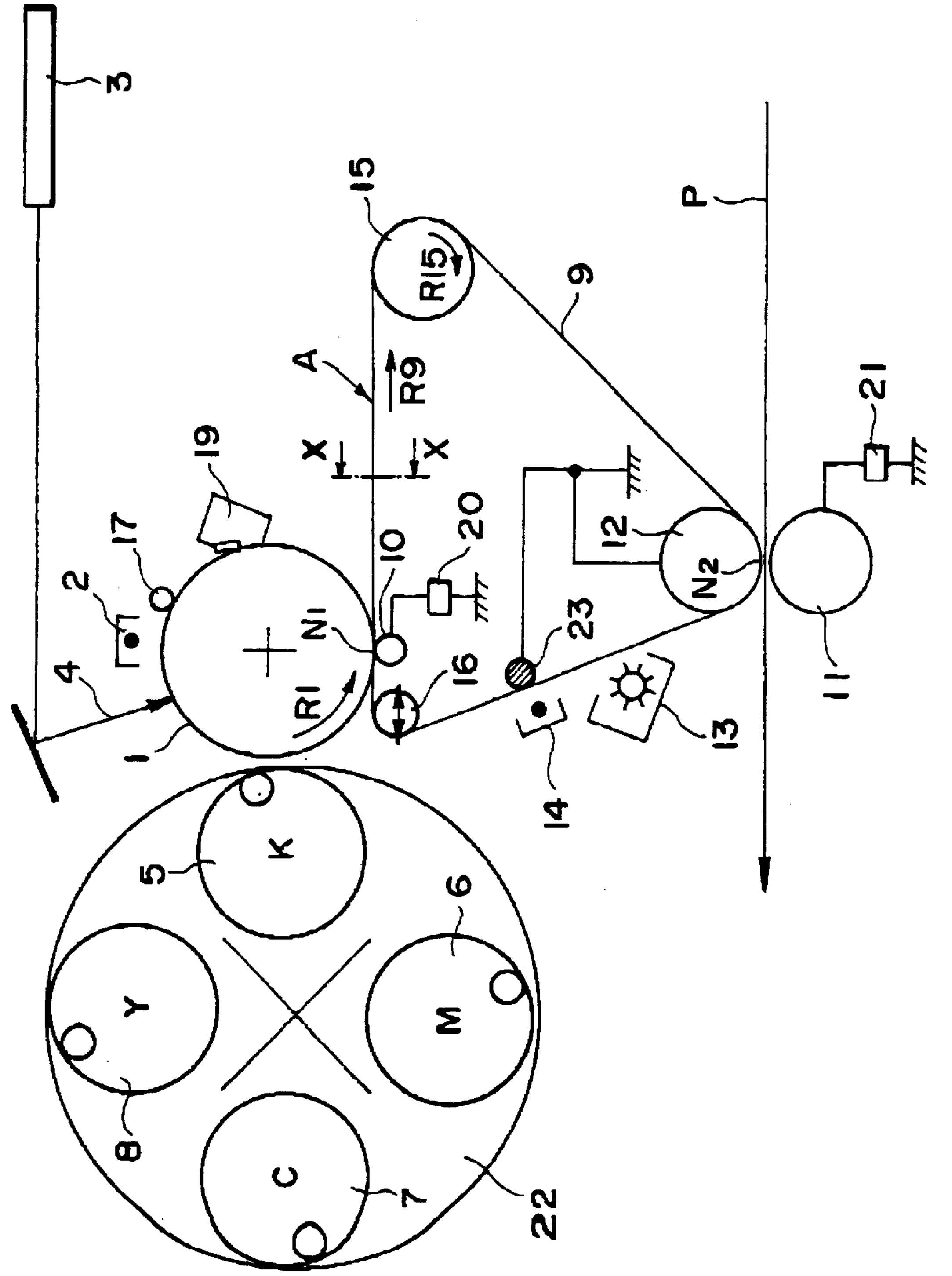
FIG. 1 is a longitudinal sectional view showing a schematic structure of an image forming apparatus according to Embodiment 1.

FIG. 1 is a vertical section of an image forming apparatus in accordance with the present invention, depicting the general structure thereof. The image forming apparatus illustrated in the drawing is a full-color laser beam printer based on four primary colors.

The image forming apparatus in the drawing is provided with an electrophotographic photosensitive member 1 (hereinafter, "photosensitive drum") as a first image bearing member, which is in the form of a drum. The photosensitive drum 1 is constituted of a cylindrical base member, that is, a drum formed of aluminum, for example, and a photosensitive layer, that is, a layer of organic photoconductor, coated on the peripheral surface of the base member. The photosensitive drum 1 is rotatively supported by the main assembly (unillustrated, and hereinafter, "apparatus main assembly") of the image forming apparatus, and is rotatively driven in the direction of an arrow mark R1 by a driving means (unillustrated). The photosensitive drum 1 is surrounded by: a charger 2 for uniformly charging the peripheral surface of the photosensitive drum 1; an exposing means 3 for forming an electrostatic latent image on the surface of the photosensitive drum 1 by projecting a laser beam 4 which reflects image data; four developing devices 5, 6, 7 and 8, which contain black (K), magenta (M), cyan (C), and yellow (Y) toners, correspondingly, and are mounted in a rotary 22; an intermediary transfer belt 9 which constitutes a second image bearing member; a cleaner 19 for removing the residual toner which remains on the photosensitive drum 1 after the primary transfer; and a discharger 17 for discharging the surface of the photosensitive drum 1. These members and devices are disposed in the order listed above in the rotational direction of the photosensitive drum 1.

The intermediary transfer belt 9 is stretched around three supporting rollers 12, 15, and 16, which are disposed in parallel to each other. The roller 12 doubles as an auxiliary transfer roller for the secondary transfer (hereinafter, "auxiliary secondary transfer roller"). The rollers 15 and 16 are a driver roller and a tension roller, respectively. Oil the inward facing side of the intermediary transfer belt 9, a roller 10 for the primary transfer (hereinafter, "primary transfer roller") is disposed in contact with the intermediary transfer belt 9, placing the intermediary transfer belt 9 in contact with the photosensitive drum 1. The primary transfer roller 10 presses the intermediary transfer belt 9 against the surface of the photosensitive drum 1, forming a nip $N_1$ for the primary transfer, between the photosensitive drum 1 and the intermediary transfer belt 9. The primary transfer roller 10 is connected to a power source 20 for the primary transfer (hereinafter, "primary transfer power source"). A roller 11 is the principal roller for the secondary transfer (hereinafter, "principal secondary transfer roller"), which is disposed in a manner to oppose the auxiliary secondary transfer roller 12, being in contact with the outward facing surface of the intermediary transfer belt 9 stretched around the auxiliary secondary transfer roller 12. The principal secondary transfer roller 11 presses on the photosensitive drum 1, with the intermediary transfer belt 9 interposed, forming thereby a nip $N_2$ for the secondary transfer (hereinafter, "secondary transfer nip"), between the auxiliary second transfer roller 12 and the intermediary transfer belt 9. The principal secondary transfer roller 11 is connected to a power source 21 for the secondary transfer. The intermediary transfer belt 9 is rotatively driven in the direction of an arrow mark R9 as the driver roller 15 is rotatively driven in the direction of an arrow mark R15 by a driving means (unillustrated).

The cleaner 13 for removing the residual toner which remains adhered to the surface of the intermediary transfer belt 9 after the secondary transfer, and the discharger 14 for discharging the intermediary transfer belt 9, are disposed in this order to be on the downstream side of the secondary transfer nip $N_2$ and on the upstream side of the primary transfer nip $N_1$, relative to the rotational direction of the intermediary transfer belt 9. They are disposed to face the outward facing surface of the intermediary transfer belt 9.

The intermediary transfer belt 9 and supporting rollers (tension roller 16 and the like) will be described later in detail.

The toner image formed on the intermediary transfer belt 9 is transferred (secondary transfer) onto a transfer material P such as paper delivered to the secondary transfer nip $N_2$ by a conveying means (unillustrated).

Next, the operation of the image forming apparatus with the above described structure will be briefly described.

While the photosensitive drum 1 is rotatively driven in the direction of the arrow mark R1, the surface thereof is uniformly charged by the charger 2. Thereafter, the surface of the photosensitive drum 1 is exposed to the laser beam 4 projected according to the image data by the exposing means 3. As a result, an electrostatic latent image is formed on the surface of the photosensitive drum 1. This electrostatic latent image is developed into a toner image by the developing device 8 containing the yellow toner (hereinafter, "yellow-developing device") positioned, by the rotation of the rotary 22, at a developing point at which each developing device comes closest to the photosensitive drum 1 (FIG. 1, however, shows a state in which the black-developing device 5 is at the developing point); yellow toner is adhered to *he electrostatic latent image. This toner image is transferred (primary transfer) onto the surface of the intermediary transfer belt 9, which is rotating in the direction of the arrow mark R9, by applying primary transfer bias to the primary transfer roller 10 from the primary transfer power source 20. After the primary transfer of the toner image, the residual toner which remains on the surface of the photosensitive drum 1, that is, the toner which is not transferred onto the intermediary transfer belt 9 from the photosensitive drum 1, is removed by the cleaner 19, and then, the surface charge of the photosensitive drum 1 is discharged by the discharger 17. Thereafter, the photosensitive drum 1 is used for the formation of the second toner image, or the magenta toner image.

An image formation sequence constituted of the aforementioned charging, exposing, primary transferring, cleaning, and discharging processes is carried out tor the magenta, cyan, and black colors, using the developing devices 6, 7, and 8, which contain magenta, cyan, and black toners, correspondingly. Consequently, four color toner images are superposed on the intermediary transfer belt 9. These toner images are transferred together (secondary transfer) onto the transfer material P by applying the bias for the secondary transfer (hereinafter, secondary transfer bias) to the secondary transfer roller 11 from the secondary transfer power source 21. After the secondary transfer of the toner images, the toner images on the transfer material P are fixed to the transfer material P by a fixing device (unillustrated), to complete the image formation.

After the secondary transfer, the residual tuner on the intermediary transfer belt 9, that is, the toner which fails to be transferred onto the transfer material P, is removed by the cleaner 13, and the surface charge of the intermediary transfer belt 9 is discharged by the discharger 14. A typical discharger used as the discharger 14 is a discharger which discharges AC corona. Generally, a counter electrode 23 for the discharger 14 is disposed on the inward facing side of the intermediary transfer belt 9 in order to improve the efficiency of the discharger 14.

Next, the intermediary transfer belt 9, the supporting rollers, and the like, the distinctiveness of which characterizes the present invention, will be described in detail.

In this first embodiment, the smallest of the diameters among the diameters of the auxiliary secondary transfer roller 12, driver roller 15, and tension roller 16, is that of the tension roller 16, which is 16 mm.

Figure 2:
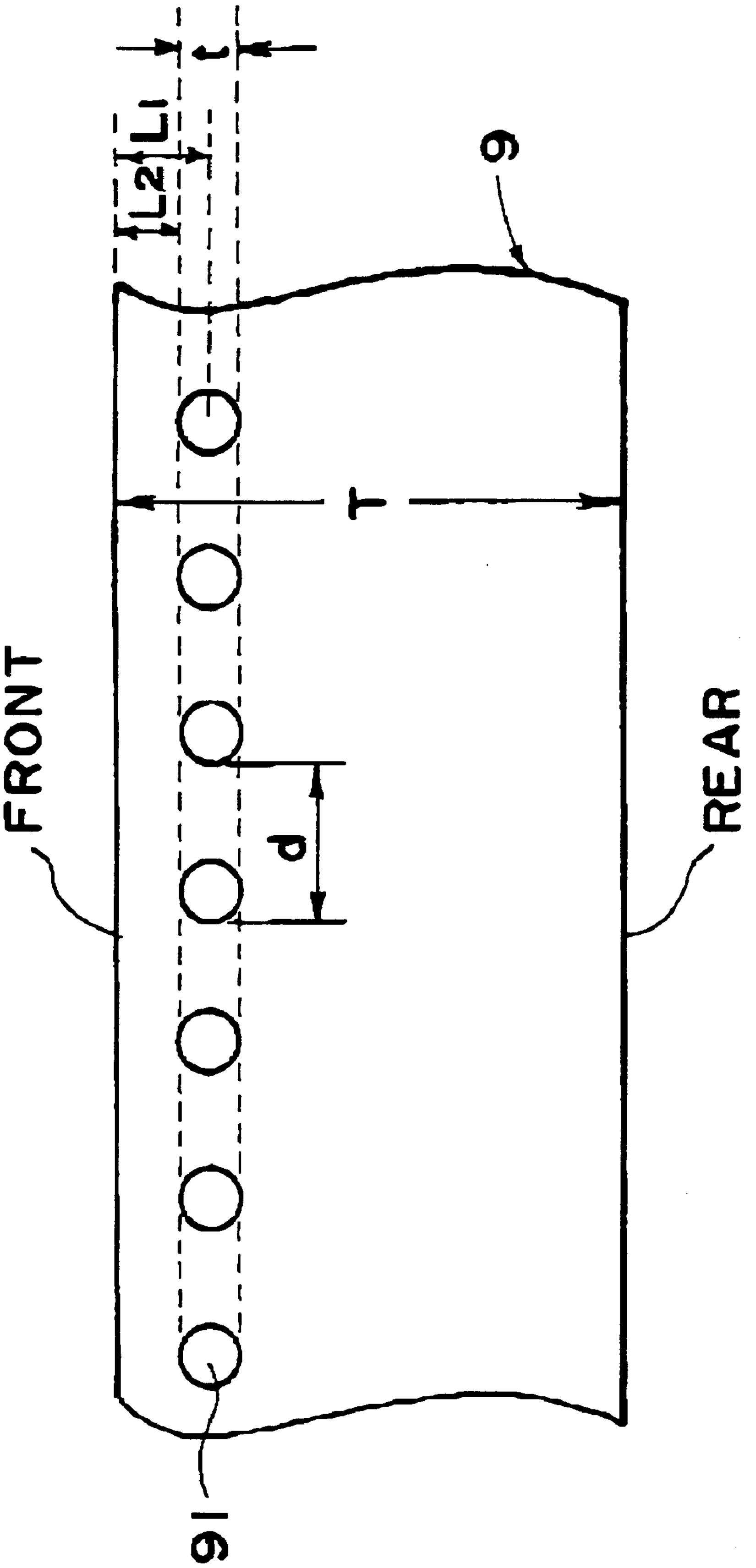
FIG. 2 is a perspective view of an intermediary transfer belt taken along a line X—X in FIG. 1 or 3.
Figure 3:
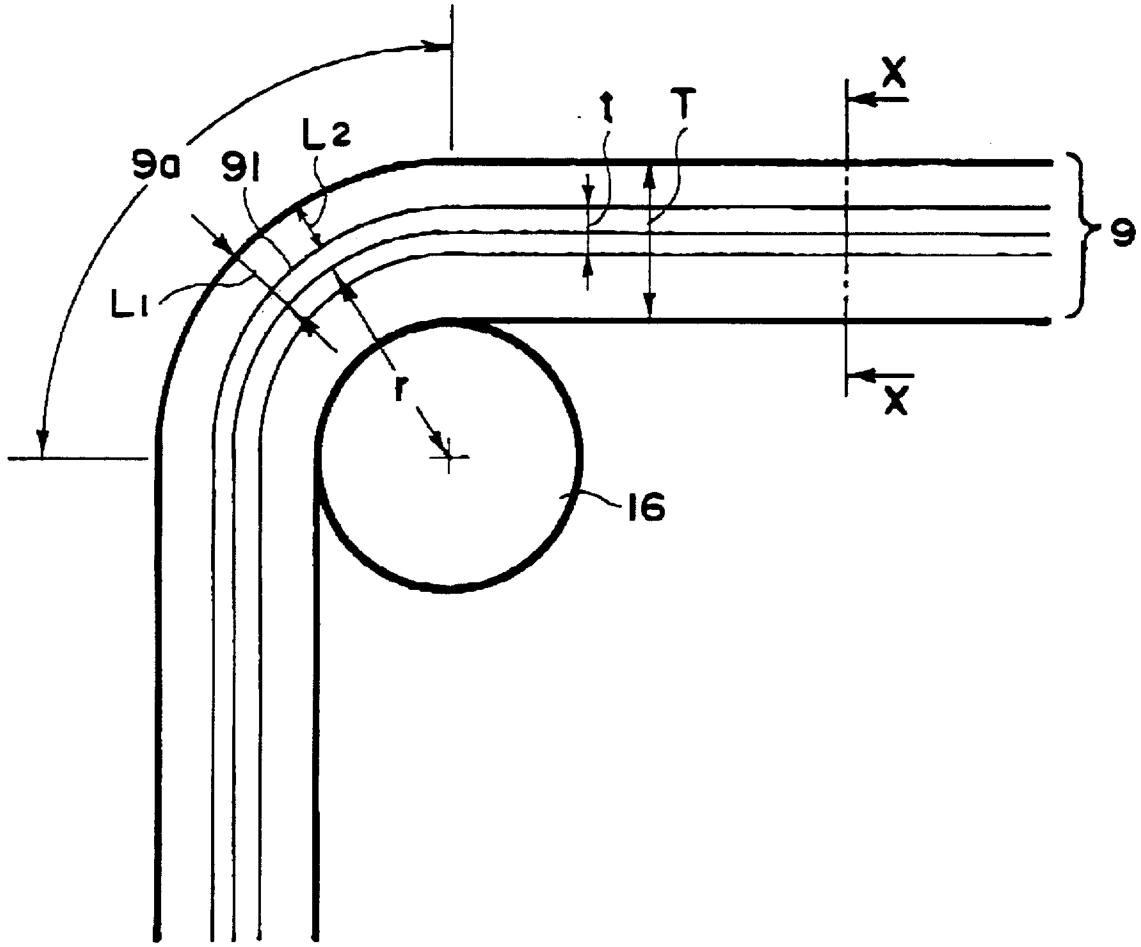
FIG. 3 is an illustration of an intermediary transfer belt according to Embodiment 1 trained or extended around the tension roller (supporting shaft).
Figure 4:
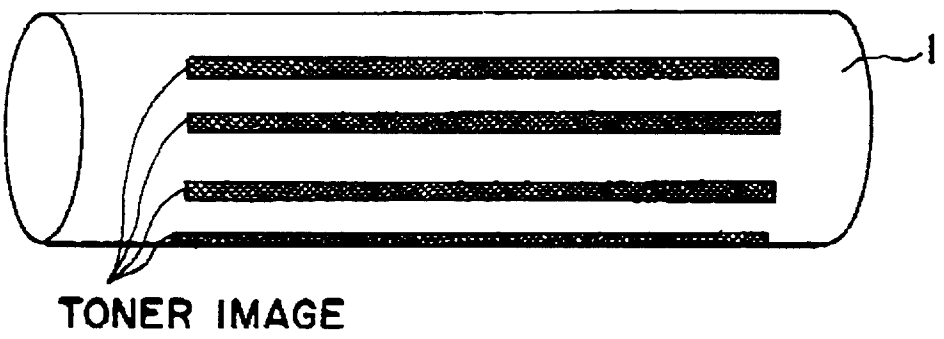
FIG. 4 shows a toner image formed on a photosensitive drum to measure elongation of the surface of an intermediary transfer belt.

Referring to FIG. 2 (sectional view of the intermediary transfer belt 9 at a line X-X' indicated by arrow marks in FIG. 1 or 3), the intermediary transfer belt 9 is a 0.7 mm thick rubber belt formed of NBR (rubber), which includes a belt core 91. A thickness T, and distance $L_1$ and $L_2$, in FIG. 3 were measured by Profile Micrometer VF-7510 (product of KIIENSU Co.) at the sectional surface of the intermediary transfer belt 9 obtained by cutting the intermediary transfer belt 9 in the direction perpendicular to the rotational direction of the intermediary transfer belt 9, at a point which was not in a curved range 9*a* in which the intermediary transfer belt 9 went around the roller, in contact with the roller. As will be described later, in the curved range 9*a,* the intermediary transfer belt 9 was elongated on the outward side, but the values of the thickness T, and the distances $L_1$ and $L_2$, in the curved range 9*a,* were substantially the same as the values of the thickness T, and the distances $L_1$ and $L_2$, outside the curved range 9*a;* according to the observation made by the inventors of the present invention, the changes which occurred to the thickness T, and the distance $L_1$ and $L_2$, as the intermediary transfer belt 9 entered the curved range 9*a,* were so small relative to the thickness T that they were negligible, and the distances $L_1$ and $L_2$, outside the curved range 9*a.* The belt core 91 is a single strand of 0.1 mm thick cord laid at a slight angle relative to the edge of the intermediary transfer belt 9, in a manner of spirally following the plane of the intermediary transfer belt 9. The distance d between the adjacent two spiral loops of the cord is 0.5 mm; in other words, if the cord is traced once along the periphery of the intermediary transfer belt 9 from any given point, the reached point is 0.5 mm away from the given point in the lateral direction.

Referring to FIG. 3, in the curved range 9*a,* the distance $L_1$ between the center of the belt core 91 in the thickness direction of the intermediary transfer belt 9, and the outward surface of the intermediary transfer belt 9, is 0.15 mm.

In this embodiment, the distance from the rotational axis of the supporting roller with the smallest diameter (hereinafter, "smallest roller", which is the tension roller 16 in the case of this embodiment), and the center of the belt core 91 in the curved range 9*a* is represented by r (mm); the distance from the center of the belt core 91 to the outward surface of the intermediary transfer belt 9 in the curved range 9*a,* $L_1$ (mm); the thickness of the cord of the belt core 91, t (mm), and the distance from the outward surface of the belt core 91 to the outward surface of the intermediary transfer belt 9 in the curved range 9*a* is represented with $L_2$ (mm). Further, the surface elongation ratio of the intermediary transfer belt 9 is represented by K (%) Then, the relationship between the values of these determinants, and the degree of image deterioration, was studied.

The surface elongation ratio K (%) was defined as follows.

If the distance between any two points on the outward surface aligned in the rotational direction of the intermediary transfer belt 9 is h (mm) when the two points are in a rotational range in which the intermediary transfer belt 9 is flat, and the distance between the same two points is H (mm) when the two points are in the curved range 9*a,*

$$K=\{(H-h)/h\times100\}.$$

In this study, seven intermediary transfer belts ITB-a, ITB-b, ITB-c, ITB-d, ITB-e, ITB-f and ITB-g (hereinafter, the intermediary transfer belt 9 may be abbreviated as "ITB" for convenience) which were different in the thickness T (mm) were used in conjunction with the image forming apparatus illustrated in FIG. 1. The smallest roller was the tension roller 16, as described above, which had a diameter of 16 mm. In the image forming apparatus in FIG. 1, the ITB, the supporting rollers, and the like were integrated as an ITB unit, which was removably installable in the apparatus main assembly.

Figure 11:
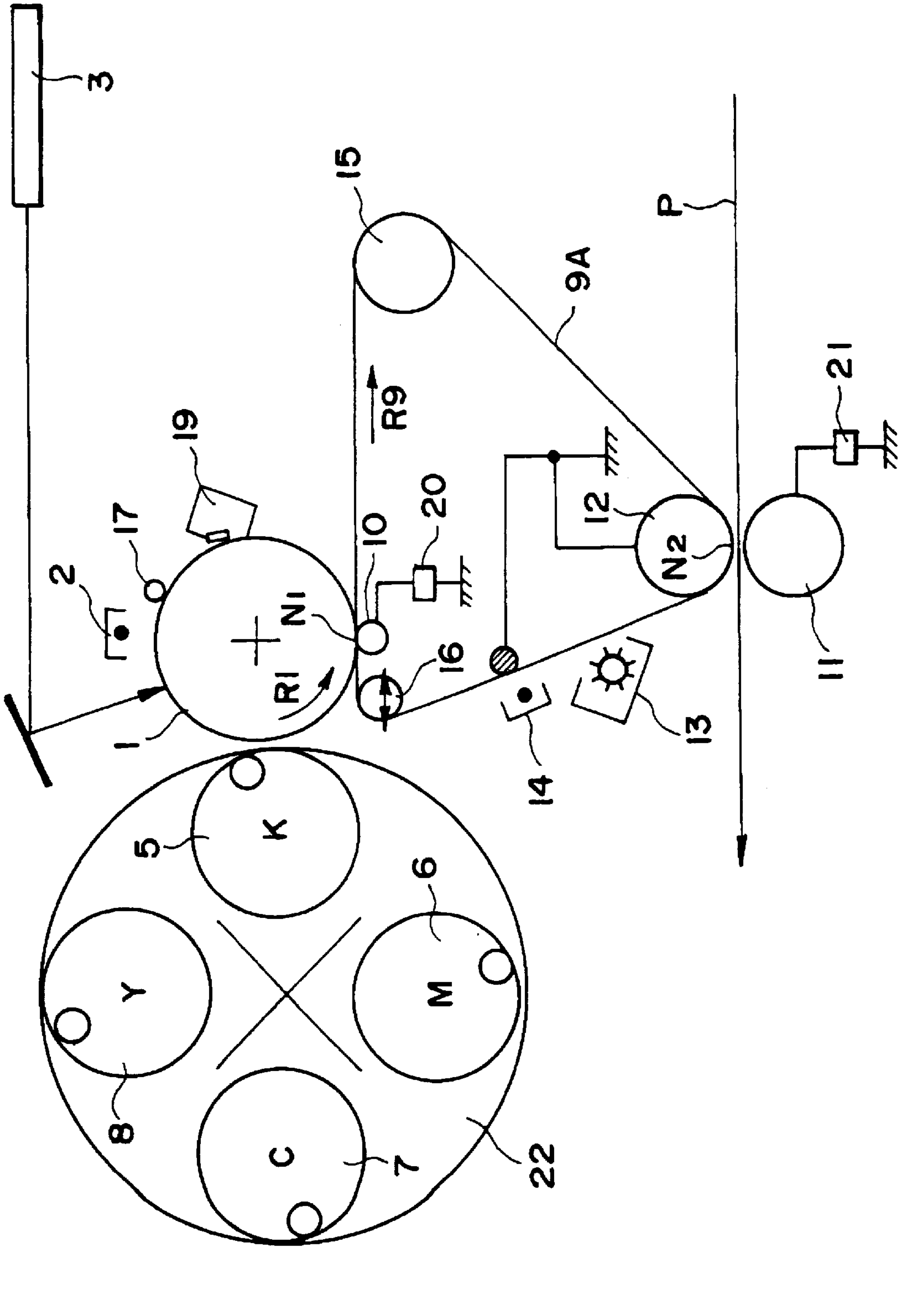
FIG. 11 is a longitudinal sectional view of an image forming apparatus of Embodiment 1.
Figure 12:
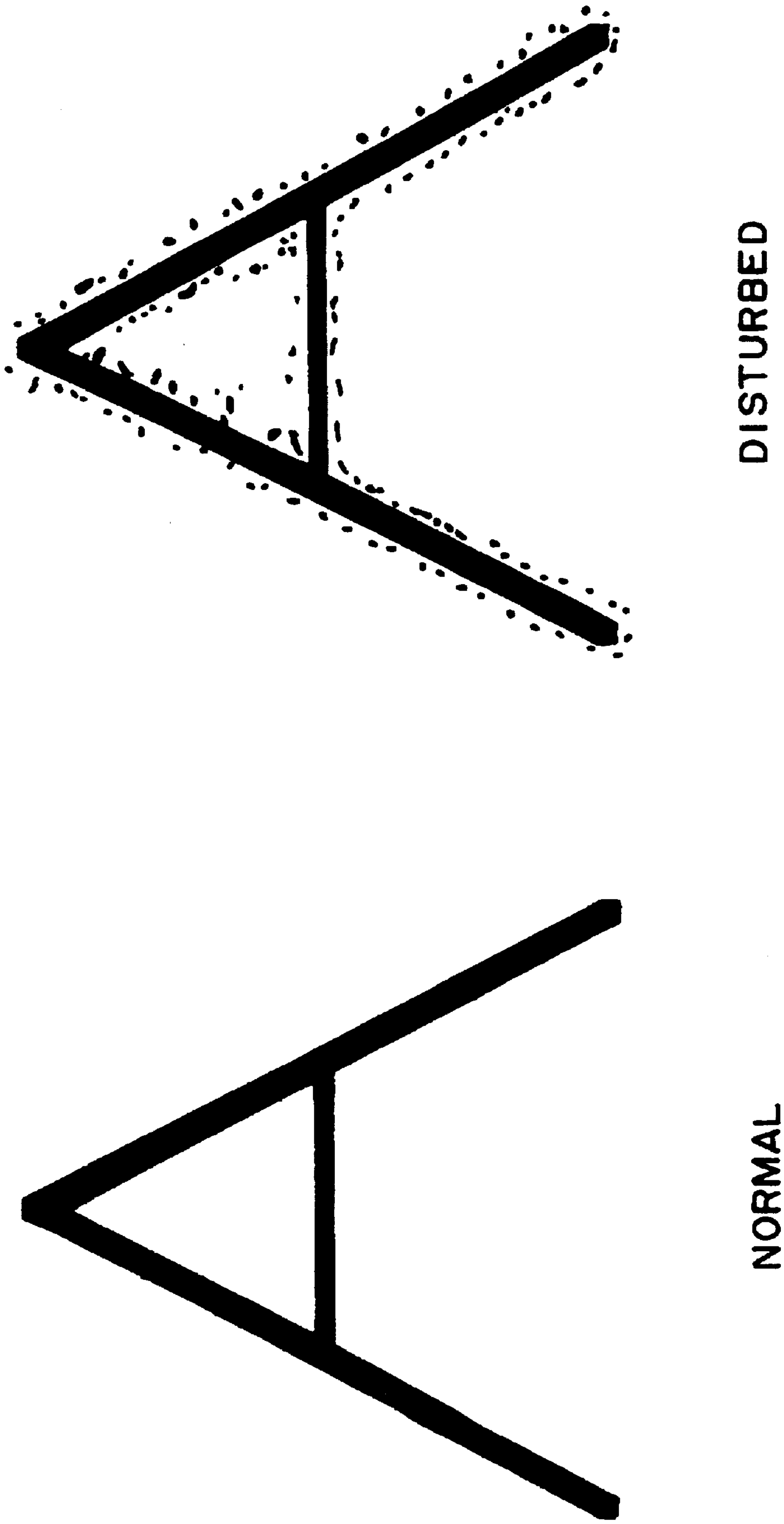
FIG. 12 is an illustration of disturbance of an image due to curvature of the intermediary transfer belt by the supporting shaft.

The thicknesses T and distances $L_1$ of the seven different ITB's are shown in FIG. 13. The rubber portion of any of the seven different ITB's was composed of NBR, and their core portions 91 were formed of a single cord having a thickness t of 0.2 mm, which was laid at a slight angle relative to the edge of the ITB, in a manner to spirally follow the plane of the ITB. In the case of the apparatus illustrated in FIG. 11, which was used in this study, the peripheral velocities of the photosensitive drum 1 and the ITB were the same.

(Method for obtaining the surface elongation ratio X)

Figure 5:
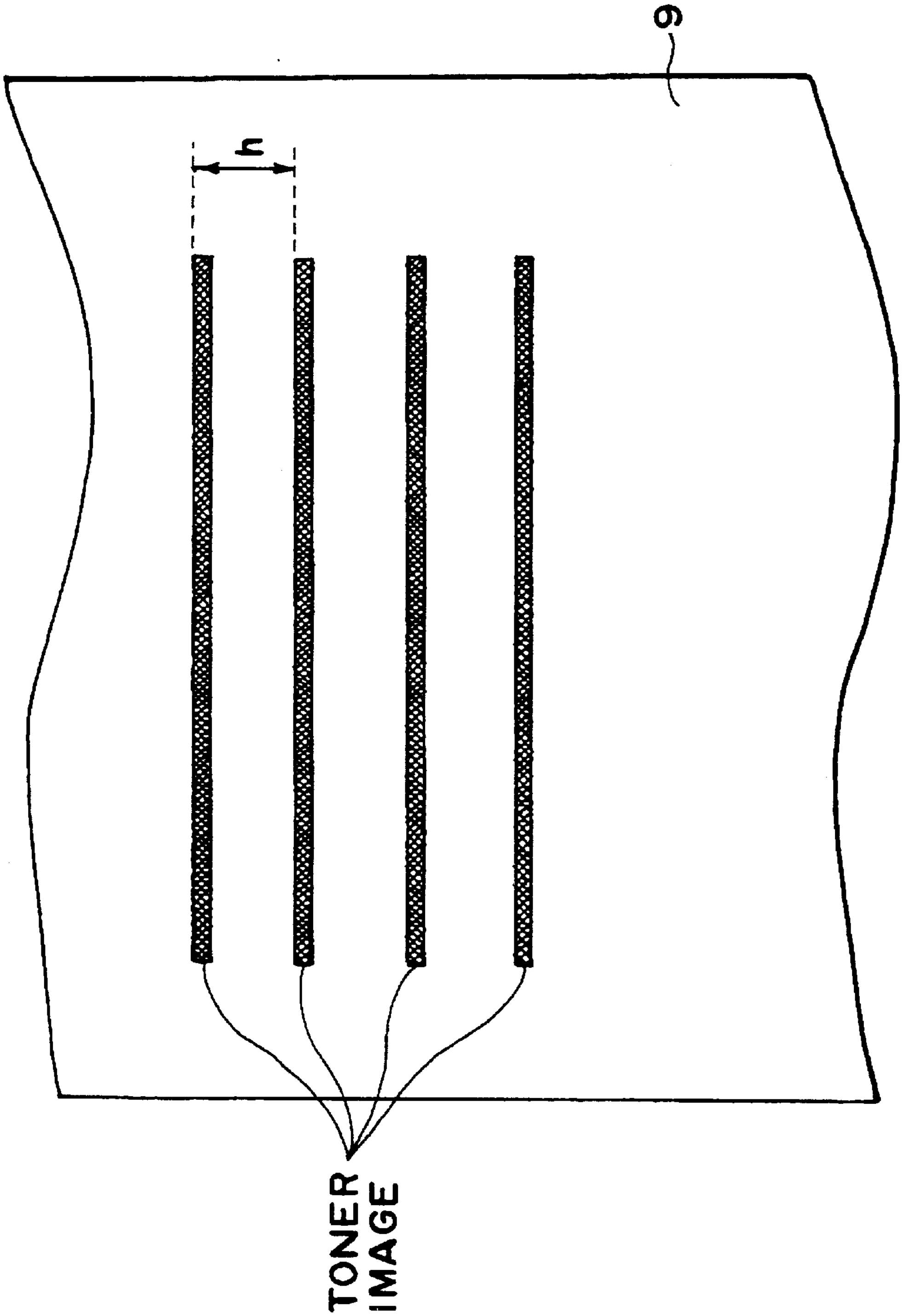
FIG. 5 shows a toner image transferred onto an intermediary transfer belt to measure the elongation of the surface of an intermediary transfer belt.

1. Form a toner image comprising four 0.15 mm wide straight lines which parallelly extend in the direction of the generatrix and have intervals of 0.45 mm.
2. Stop the image forming apparatus after all our lines of toner are transferred (primary transfer) onto the intermediary transfer belt 9.
3. Remove the ITB unit A, on which the toner image comprising the four straight lines is borne, from the apparatus main assembly.
4. Rotate the ITB manually so that the toner image is positioned in the range between the tension roller 16 and the driver roller 15, illustrated in FIG. 1, in which the ITB becomes flat.
5. Measure the interval h between the adjacent two toner lines, defined in FIG. 5 (lines are formed so that the interval h becomes 0.60 when the ITB is flat: h=0.15+0.45=0.60). In other words, measure three intervals h, and then, average the thus obtained three values.
6. Move the toner image into the range correspondent to the peripheral surface of the tension roller 16 illustrated in FIG. 3. In other words, position the portion of the intermediary transfer belt 9, on which the toner image is borne, in the curved range 9*a.*
7. Measure the intervals between the adjacent two lines as in step 5, and average the obtained values.

The above operation was carried out for the seven different ITB's.

(Study of image deterioration)

1. Form a toner image of letters with a practical size on the photosensitive drum 1.
2. Transfer (primary transfer) this image onto the ITB, and stop the image forming apparatus immediately after this toner image passes the tension roller 16.
3. Evaluate the degree of image deterioration (toner image deterioration).

(Results)

FIG. 14 presents the aforementioned surface elongation ratio K (in the drawing, "elongation ratio"), and the results of the evaluation of the image deterioration.

It is evident from these results that the image deterioration worsens as the surface elongation ratio increases. If the surface elongation ratio K exceeds 10% (for example, 12% in the case of ITB-a), the image deterioration reaches an intolerable level. If the surface elongation ratio K is below 10%, the image deterioration remains at a level at which the image does not suffer from any practical problem. If the elongation ratio K is no more than 6%, the image deterioration does not occur.

It is also evident from these results that the following relation exists among the distance $L_1$ (mm) from the center of the belt core 91 to the outward surface of the ITB, the distance r (mm) from the rotational axis of the smallest roller (tension roller 16) to the center of the belt core 91, and the surface elongation ratio K (%):

$$K=\{(L_1+r)/(r-1.0)\}\times100 \qquad (1).$$

This relation seems to exist because while the ITB runs along the peripheral surface of the smallest roller iii the curved range 9*a,* forming an arc, the outward side of the ITB, with reference to the belt core 91, is stretched, and the inward side of the ITB is compressed.

Therefore, in order to prevent the image deterioration caused by the elongation of the outward side of the ITB, the surface elongation ratio K must be sufficiently reduced. This embodiment confirmed that the elongation ratio K had to satisfy the following requirement:

$$K\leqq10 \qquad (2).$$

Figure 6:
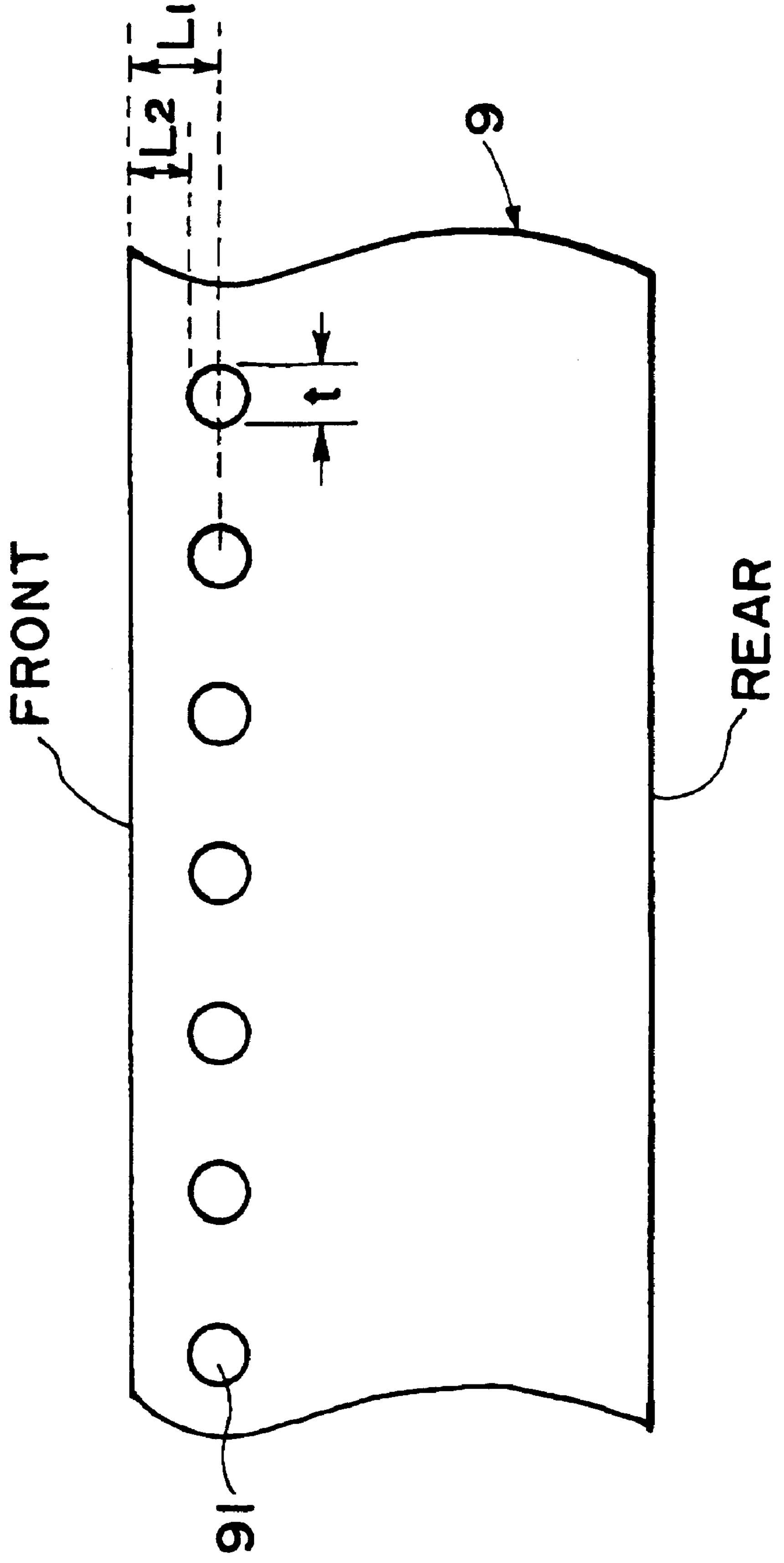
FIG. 6 is a longitudinal sectional view of an intermediary transfer belt in Embodiment 1.

Next, the relationship between the distance $L_2$ (mm) from the outward surface of the belt core 91 to the outward surface of the ITB, and the thickness t (mm) of the cord of the belt core 91, was studied (FIG. 6).

In this study, the effect of the pattern of the belt core 91 on the image was studied by outputting a solid image with a density of 0.9 measured by a densitometer by Macbeth Co. In the study, seven ITB's different in the distance $L_2$ and the thickness t, were used. The thickness T was 0.9 mm for all seven ITB's, and the diameter of the tension roller 16, the smallest roller, was 16 mm.

(Results)

FIG. 15 presents the results of the study.

It is evident from the results given in FIG. 15 that in order to reduce the pattern of the belt core 91, which appears in an image, to a practically ignorable level, the following requirement must be satisfied:

$$L_2/t\geqq0.5 \qquad (3)$$

In other words, it is evident according to this study that as the thickness t of the cord of the belt core 91 is increased, the length $L_2$ must be also increased. It seems that the appearance of the pattern of the belt core 91 in an image is traceable to the unevenness of the surface of the ITB, which reflects the contour of the surface of the belt core 91. Therefore, as the unevenness of the core surface is increased by the increase in the thickness t of the cord of the belt core 91, the distance $L_2$ must be correspondingly increased to compensate for the increased unevenness of the core surface.

According to the results of this study, the following is evident. First, in order to prevent the image deterioration traceable to the elongation of the ITB surface, both mathematic formulas (1) and (2) must be satisfies, and therefore:

$$\{(L_1+r)/(r-1.0)\}\times 100 \leqq 10.0.$$

This formula can be modified into:

$$L_1 \leqq 0.1r \quad (4).$$

This is the condition for preventing the occurrence of the image deterioration.

Next, as for the condition for preventing the pattern of the belt core 91 from appearing in an image, it is derived by modifying Formula (3):

$$L_2 \leqq 0.5t \quad (5).$$

It the diameter of the smallest roller is too small, the roller lacks rigidity, which makes it impossible to provide the ITB with a proper amount of tension. If the diameter of the smallest roller is too large, the rigidity of the roller is naturally sufficient, but the size of the motor for driving the roller must be increased to accommodate the roller with the larger size, which is ultimately one of the causes for increase in the overall cost of the apparatus. Therefore, the diameter of the smallest roller is desired to be in an approximate range of 6 mm–100 mm.

If the ITB is too thin, it lacks sufficient rigidity. If it is too thick, it does not conform to the curvature of the supporting roller when it goes around the supporting roller, failing to run smoothly. Therefore, the thickness of the ITB is desired to be in an approximate range of 0.2 mm–3.0 mm.

As for the thickness of the cord of the ITB, if the cord of the belt core is too fine, the core is liable to snap, which defeats the purpose of improving the durability of the ITB. If the cord is too thick, the ITB becomes too stiff, causing such transfer failure as central transfer drop-out, and also, the ITB is liable to be permanently bent while it goes around the supporting rollers. The thickness of the cord may be increased if softer material is used for the cord, but such material increases the stress relaxation of the core, rendering the core useless. Thus, the thickness of the cord of the core is desired to be in an approximate range of 0.05 mm–0.3 mm.

Taking the above findings into consideration, the distance r and $L_1$ must satisfy the following formulas:

$$0.025+3 \leqq r \leqq 2.975+50 \text{ (mm)}$$

$$0.025 \leqq L_1 \leqq 2.975 \text{ (mm)}.$$

Therefore, the next formula can be derived from Formula (4):

$$0.025 \leqq L_1 \leqq 0.1r < 5.3 \text{ (mm)} \quad (4).$$

Since, $$L_2 \leqq 2.95 \text{ (mm), and}$$

$$0.05 \leqq t \leqq 0.3 \text{ (mm)}.$$

Formula (5) can be modified into:

$$2.95 \geqq L_2 \geqq 0.5t \geqq 0.025 \text{ (mm)}$$

The requirements for preventing the occurrence of the image deterioration traceable to the elongation of the ITB surface, as well as preventing the pattern of the belt core 91 from appearing in an image is to satisfy both of the following formulas:

$$L_1 \leqq 0.1r \quad (4)$$

$$L_2 > 0.5t \quad (5).$$

In the first embodiment described above, both formulas (4) and (5) were satisfied, and neither the image deterioration, nor the appearance of the core pattern in an image, occurred at all.

More specifically, the specifications of the first embodiment of the intermediary transfer belt in accordance with the present invention was as follows:

$$L_1=0.15 \text{ (mm)}$$

$$t=0.1 \text{ (mm)}$$

$$L_2=L_1-t/2=0.15-0.05=0.1 \text{ (mm)}$$

$$r=16/2+(T-L_1)=8+(0.7-0.15)=8.55 \text{ (mm)}.$$

Next, substituting these values for r and t in the formulas (4) and (5).

$$L_1=0.15 \leqq 0.1\times 8.55=0.855=0.1r$$

$$L_2=0.1 \leqq 0.5\times 0.1=0.05=0.5t.$$

In other words, it was confirmed that the specifications satisfied both Formulas (4) and (5).

Embodiment 2

Figure 7:
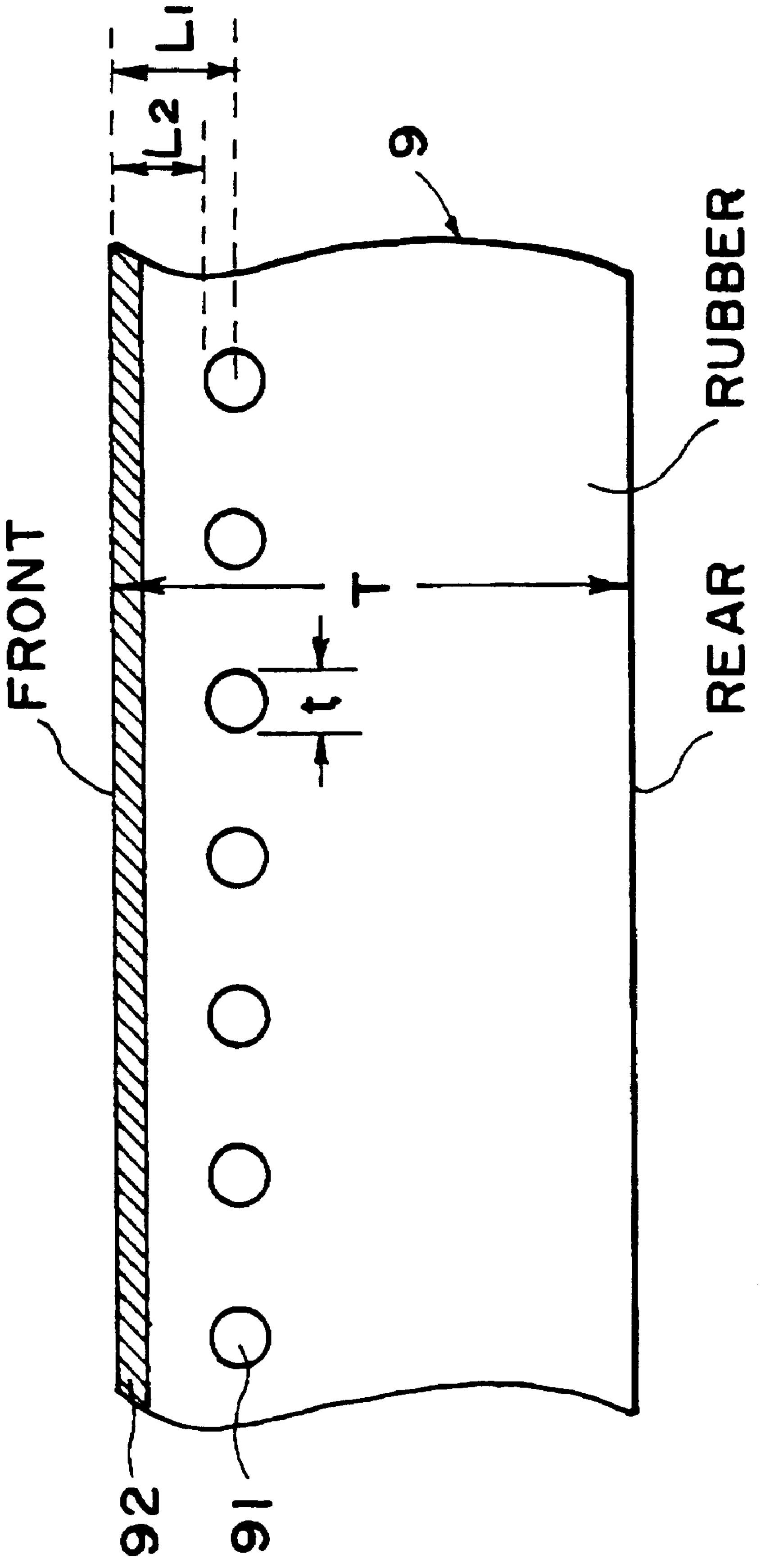
FIG. 7 is a longitudinal sectional view of an intermediary transfer belt in Embodiment 2.

FIG. 7 is a section of the second embodiment of the intermediary transfer belt 9 (ITB) in accordance with the present invention. The ITB illustrated in FIG. 7 was used in the image forming apparatus illustrated in FIG. 1.

In the case of the ITB illustrated in FIG. 7, the surface of a 0.9 mm thick rubber belt was coated with fluorinated resin. The thickness of this coat layer 92 was 10 $\mu$m. The coat layer 92, the surface layer, improves the toner releasing properties of the intermediary transfer belt 9, so that the toner remaining on the intermediary transfer belt 9 after the secondary transfer can be easily removed. The distance $L_1$ from the center of the belt core 91 to the outward surface of the intermediary transfer belt 9 was 0.2 mm. The belt core 91 was formed of a single strand of 0.1 thick polyester thread laid in the circumferential direction of the intermediary transfer belt 9, in a manner to form spiral loops following the plane of the intermediary transfer belt 9. The smallest supporting roller was a tension roller 16 having a diameter of 16 mm.

Such a problem has been known that if the ITB surface is provided with the coat layer 92, the coat layer 92 is liable to crack due to the elongation of the ITB surface.

This cracking of the coat layer 92 could be prevented by satisfying the following formula:

$$K \leqq 2.6(p/n)^{1/2} \quad (6).$$

in which n is the thickness (mm) of the coat layer 92: p, the elongation ratio (%) of the coat layer 92 at the time of cracking (hereinafter, "rupture elongation ratio"); and K is the surface elongation ratio (%) of the ITB exclusive of the coat layer 92. The method for obtaining Formula (6) will be described later with reference to FIG. 9.

The rupture elongation ratio p of the coat layer 92 is obtained from the following formula:

$$p=\{(s-15)/15\}\times 100$$

in which s is the length (cm) of a 20 $\mu$m thick rectangular test piece (2 cm×15 cm) just before the test piece is severed by the elongation test, in which one of the 2 cm wide edges is fixed and the test piece is elongated in the direction of the 15 cm long edge by pulling the other 2 cm wide edge.

Deriving from the preceding Formula (1), $$K=100\ (L_1/r).$$

Substituting this value for K in Formula (6), and modifying it, $$L_1/r \leqq 0.026\ (p/n)^{1/2} \qquad (7).$$

In order to uniformly cover the case layer, and also in consideration of the durability of the coat layer 92, the thickness n of the coat layer 92 is desired to be in an approximate range of 1 $\mu$m–200 $\mu$m.

Hereinafter, a practical method for measuring the rupture elongation ratio p, and the results of the study regarding the relationship between the rupture elongation ratio p (%) and the surface elongation ratio K (%), will be presented.

(Method for measuring the rupture elongation ratio p)

Figure 8:
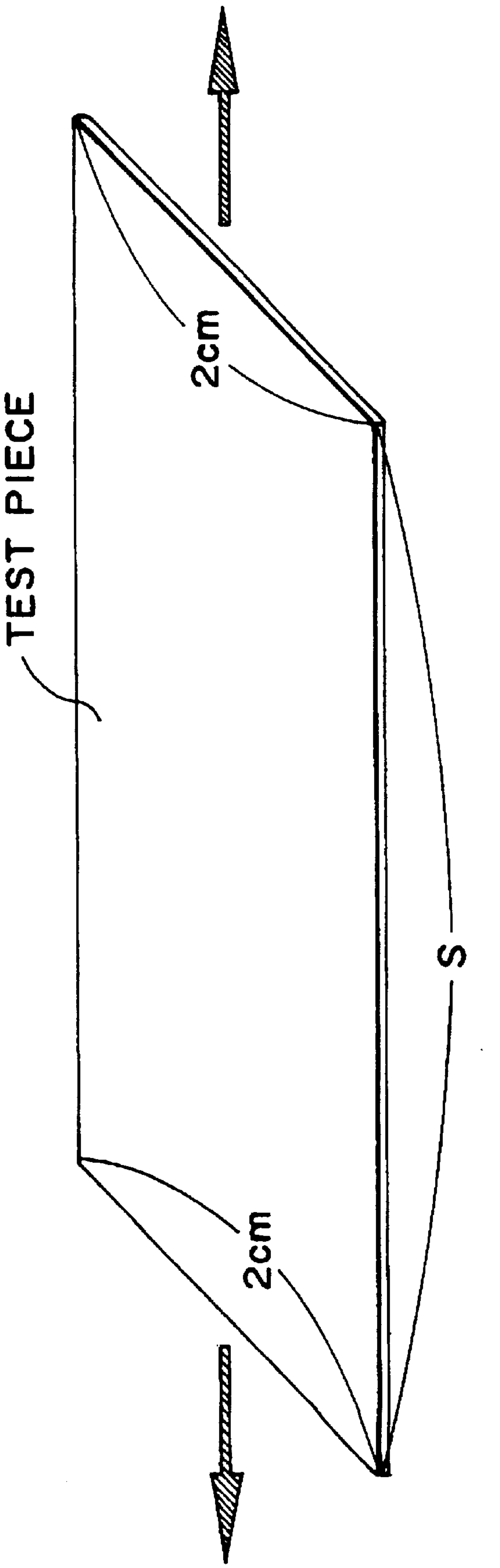
FIG. 8 is an illustration of a measuring method of a rupture elongation p.

1. Make a test piece measuring 2 cm (width)×15 cm (length)×20 $\mu$m (thickness) using a sheet coated with the same material as the coat layer 92.
2. Stretch the test piece in the direction indicated by an arrow mark iii FIG. 8 with one of the 2 cm wide edges fixed, and measure the length s (cm) of the test piece using the RTC 1250A (product of Orientec Co.) when a crack appears at the surface of the test piece. Then, obtain the value of p from the following formula:

$$p=\{(s-15)/15\}\times 100.$$

(Study of the relationship between the rupture elongation ratio p and the surface elongation ratio K)

In this study, six rubber bells with a belt core 91 were made, and each was given a coat layer 92, the thickness n ($\mu$m) of which was the same as those given to the other belts, but was different in the rupture elongation ratio p (%) from those given to the other belts, and the relationship between the surface elongation ratio k (%) and the occurrence of the cost layer cracking, was studied.

In this second embodiment, the distance $L_1$ was the distance from the center of the belt core 91 to the outward surface of the coat layer 92, and the distance $L_2$ was the distance from the outward surface of the belt core 91 to the outward surface of the coat layer 92. The thickness T of the rubber belt was 2.0 mm. The belt core 91 was formed of a single strand of 0.2 mm thick cord laid in the circumferential direction of the rubber belt in a manner to spirally follow the plane of the rubber belt. The diameter of the smallest roller (tension roller 16) was 16 mm.

Six ITB's were rendered different in the position of the belt core 91 in the direction of the thickness T of the ITB, so that they became different in the surface elongation ratio K (%) in tile curved range 9*a* in which they remained in contact with the peripheral surface of the smallest roller; 1%, 3%, 5%, 8%, 14% and 20%.

These ITB's were installed in the image forming apparatus illustrated in FIG. 1, and 100 full-color images were produced using each ITB. Then, each ITB was evaluated in terms of the rupture of the coat layer 92.

(Results)

The results of the evaluation are given in FIG. 16. The table shows the maximum value for the elongation ratio K (%) which did not cause the rupture. More specifically, the table shows that in the case of an ITB with a coat layer having a thickness n of 20 $\mu$m, for example, the rupture did not occur as long as the surface elongation ratio K (%) remained no more than 3%. As is evident from these results, this study shows that the larger in the rupture elongation ratio P the coat material is, and the thinner the coat material is coated, the less likely it is that the surface rupture occurs.

Figure 9:
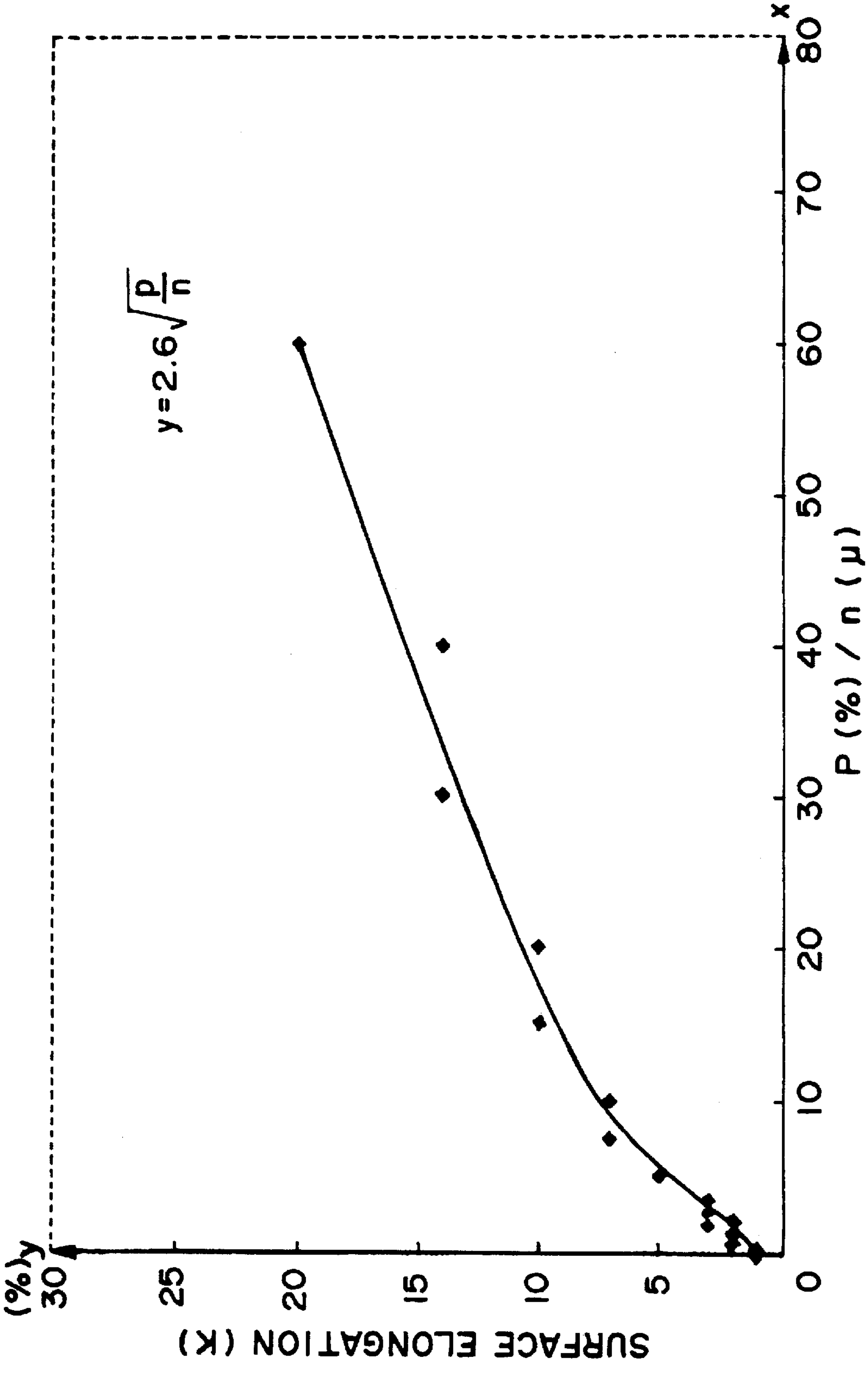
FIG. 9 shows a relation between p (rupture elongation)/n (thickness) and K (surface elongation).

Therefore, attention was paid to the value of (p/n), and the relationship between the value of the (p/n) and the maximum value of the surface elongation ratio K (%) which did not cause the rupture, was shown in the form of a graph, that is, FIG. 9. From this graph, the following relation could be derived:

$$K \leqq 2.6\ (p/n)^{1/2} \qquad (6)$$

The occurrence of the coat layer rupture could be prevented by satisfying Formula (6).

Further, even when the coat layer 92 was provided, when the distance $L_2$ between the outward surface of the belt core 91 and the outward surface of the ITB was small, the pattern of the belt core 91 appeared in an image. However, the appearance of the pattern of the belt core 91 could be prevented by satisfying Formula (5) presented in the description of the first embodiment.

The rupture elongation ratio p of the coat layer 92 of the second embodiment of the present invention was 15%.

The surface elongation ratio K of the second embodiment, in the curved range 9*a* in which the ITB was in contact with the smallest roller, was 3%.

These numbers satisfied Formula (6), and no rupture occurred to the coat layer 92.

Embodiment 3

Figure 10:
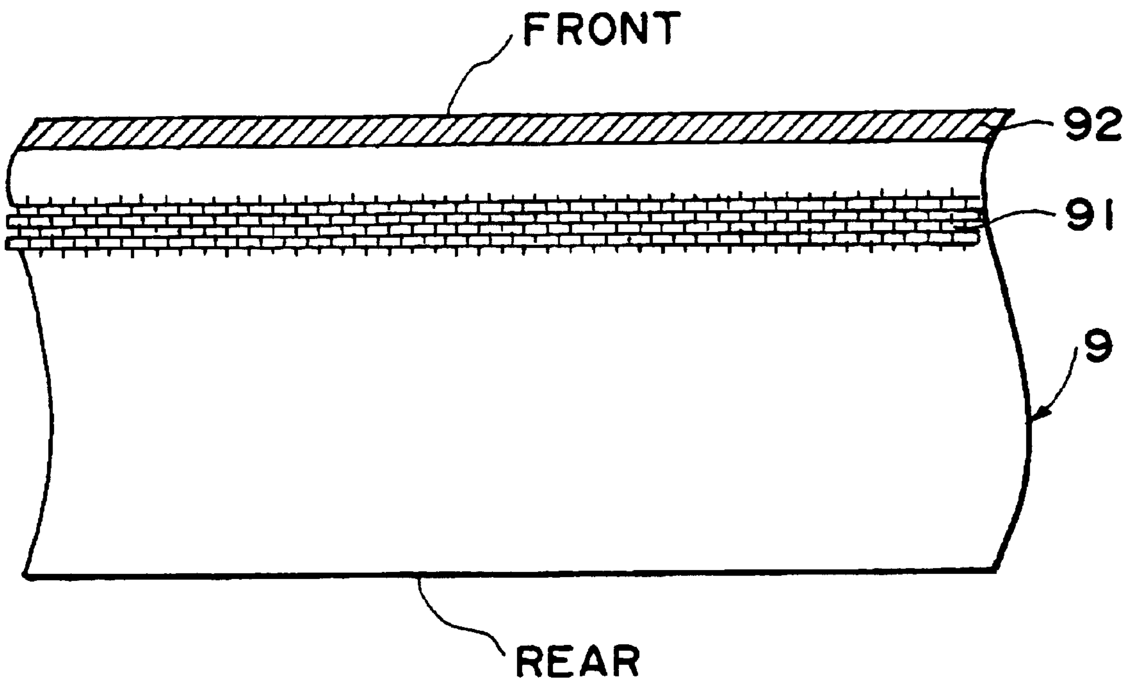
FIG. 10 is a longitudinal sectional view of an intermediary transfer belt in Embodiment 3.

FIG. 10 is a section of the third embodiment of the ITB in accordance with the present invention.

In this third embodiment, woven fabric such as sailcloth was used as the material for the belt core 91.

The thread of the sailcloth was 0.1 mm in diameter, and the thickness of the sailcloth was 0.2 mm.

The thickness T of the ITB was 0.7 mm, and the distance $L_1$ from the center of the belt core 91 to the outward surface of the ITB was 0.2 mm. The outward surface of the ITB was covered with a coat layer 92 having a rupture elongation ratio of 300%, and a thickness of 10 $\mu$m.

When this ITB was used in the image forming apparatus illustrated in FIG. 1, in which the diameter of the smallest roller (tension roller 16) was 16 mm, the image deterioration did not occur, and also, the pattern of the belt core 91 did not appear in an image.

This embodiment proved that even when the belt core 91 composed of sailcloth was employed, as long as the aforementioned Formulas (4'), (5'), (6') and (7') were satisfied, the image deterioration, the appearance of the belt core pattern, and the cracking of the coat layer 92, could be effectively prevented.

Below, a method for producing a seamless rubber belt using the sailcloth as the material for the belt core 91 will be described.

1. Melt the rubber material for an ITB into methyl-ethyl-ketone (hereinafter, this solution will be referred to as "rubber glue").
2. Dip a piece of sailcloth as a belt core 91 into this rubber glue which becomes the first elastic layer.
3. Wrap the sailcloth soaked with the rubber glue around a cylindrical mold (mandrel) (steps up to this point constitute a supporting process).
4. Wrap the sailcloth wrapped around the mandrel, with untreated rubber which becomes the second elastic layer (cloth cylinder forming process).

5. Cover the sailcloth wrapped in the untreated rubber, with a mold, and vulcanize the rubber (adhering process).

6. Remove the belt, the rubber portion of which has been vulcanized, from the mandrel, and reverse it (reversing process).

According to this method, the distance from the surface of the rubber belt to the center of the belt core can be easily adjusted by means of adjusting the density of the rubber glue and the amount of the rubber glue to be adhered to the belt core.

In the above described production method, the thickness of the rubber belt may be adjusted by polishing the exposed surface of the rubber belt before reversing the rubber belt.

In this embodiment, unvulcanized rubber was covered with a mold. However, it may be covered with wrapping tape instead of the mold.

With the employment of the above method, the distance from the outward surface of an intermediary transfer belt to the center of a belt core, which is an extremely important factor in image formation, is determined through the first process of the production method. Therefore, the production error regarding the distance from the outward surface of the intermediary transfer belt to the center of the belt core is reduced. Consequently, an intermediary transfer belt which is desirable in terms of dimensional accuracy can be manufactured.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising;

an image bearing member for bearing a toner image;

a movable intermediary transfer belt extended around a plurality of supporting shafts, said intermediary transfer belt including a core member and elastic layers sandwiching said core member, wherein a toner image on said image bearing member is transferred onto said intermediary transfer belt, and the toner image on said intermediary transfer belt is transferred onto a transfer material;

wherein a distance r (mm) between a center ot such one of said supporting shafts as has a minimum diameter and a center of said core member, a distance $L_1$ (mm) between the center of said core member and a surface of said intermediary transfer belt where toner image transfer occurs, a distance $L_2$ (mm) between a surface of said core member and the surface of said intermediary transfer belt where the toner image transfer occurs, and a size t (mm) of said core member measured in a direction perpendicular to a movement direction of said intermediary transfer belt, satisfy:

$$L_1 \leqq 0.1r, \text{ and}$$

$$0.5t < L_2.$$

2. An apparatus according to claim 1, wherein the minimum diameter is 6–100 (mm).

3. An apparatus according to claim 1, wherein the thickness of said intermediary transfer belt is 0.2–3 (mm).

4. An apparatus according to claim 1, wherein said core member has a thickness of 0.05–0.3 (mm) measured in a direction perpendicular to a movement direction of said intermediary transfer belt.

5. An apparatus according to claim 4, wherein said core member is helically wound relative to the movement direction of said intermediary transfer belt.

6. An apparatus according to claim 5, wherein said core member includes a thread.

7. An apparatus according to claim 1, wherein said intermediary transfer belt includes a coating layer coating said elastic layer, and wherein a thickness n ($\mu$m) of said coating layer, and an elongation p (%) of said coating layer when crack occurs in said coating layer when said coating layer having a predetermined size is pulled by predetermined force, satisfy:

$$L_1/r \leqq 0.026\ (p/n)^{1/2}.$$

8. An image forming apparatus according to claim 1, wherein the image bearing member is capable of bearing a plurality of color toner images, which are sequentially transferred and superimposed onto said intermediary transfer belt, and the color toner images are transferred onto a transfer material from said intermediary transfer belt.

9. An image forming apparatus comprising:

an image bearing member for bearing a toner image;

a movable intermediary transfer belt extended around a plurality of supporting shafts, said intermediary transfer belt including a core member and elastic layers sandwiching said core member, wherein a toner image on said image bearing member is transferred onto said intermediary transfer belt, and the toner image on said intermediary transfer belt is transferred onto a transfer material;

wherein a distance r (mm) between a center of such one of supporting shafts as has a minimum diameter and a center of said core member, and a distance $L_1$ (mm) between the center of said core member and a surface of said intermediary transfer belt where toner image transfer occurs, satisfy:

$$0.025 \leqq L_1 \leqq 0.1r < 5.3 \text{ (mm)}.$$

10. An apparatus according to claim 9, wherein the minimum diameter is 6–100 (mm).

11. An apparatus according to claim 9, wherein the thickness of said intermediary transfer belt is 0.2–3 (mm).

12. An apparatus according to claim 9, wherein said core member has a thickness of 0.05–0.3 (mm) measured in a direction perpendicular to a movement direction of said intermediary transfer belt.

13. An apparatus according to claim 12, wherein said core member is helically wound relative to the movement direction of said intermediary transfer belt.

14. An apparatus according to claim 13, wherein said core member includes a thread.

15. An apparatus according to claim 9, wherein a distance $L_2$ (mm) between a surface of said core member and the surface of said intermediary transfer belt where the toner image transfer occurs, and a size t (mm) of said core member measured in a direction perpendicular to a movement direction of said intermediary transfer belt, satisfy:

$$0.025 \leqq 0.5t \leqq L_2 \leqq 2.95 \text{ (mm)}.$$

16. An apparatus according to claim 9, wherein said intermediary transfer belt includes a coating layer coating said elastic layer, and wherein a thickness n ($\mu$m) of said coating layer, and an elongation p (%) of said coating layer when crack occurs in said coating layer when said coating layer having a predetermined size is pulled by predetermined force, satisfy:

$$L_1/r \leqq 0.026\ (p/n)^{1/2}.$$

17. An apparatus according to claim 16, wherein said coating layer has a thickness of 1–200 ($\mu$m).

18. An image forming apparatus according to claim 9, wherein the image bearing member is capable of bearing a plurality of color toner images, which are sequentially transferred and superimposed onto said intermediary transfer belt, and the color toner images are transferred onto a transfer material from said intermediary transfer belt.

19. An image forming apparatus comprising:

an image bearing member for bearing a toner image;

a movable intermediary transfer belt extended around a plurality of supporting shafts, said intermediary transfer belt including a core member and elastic layers sandwiching said core member, wherein a toner image on said image bearing member is transferred onto said intermediary transfer belt, and the toner image on said intermediary transfer belt is transferred onto a transfer material;

a distance $L_2$ (mm) between a surface of said core member and the surface of said intermediary transfer belt where the toner image transfer occurs, and a size t (mm) of said core member measured in a direction perpendicular to a movement direction of said intermediary transfer belt, satisfy;

$$0.025 \leqq 0.5t \leqq L_2 \leqq 2.95\ \text{(mm)}.$$

20. An apparatus according to claim 19, wherein said intermediary transfer belt has a thickness of 0.2– 3 (mm).

21. An apparatus according to claim 19, wherein the thickness of said core member measured in a direction perpendicular to a movement direction of said intermediary transfer belt is 0.05–0.3 (mm).

22. An apparatus according to claim 21, wherein said core member is helically wound relative to the movement direction of said intermediary transfer belt.

23. An apparatus according to claim 22, wherein said core member includes a thread.

24. An apparatus according to claim 19, wherein a distance r (mm) between a center of such one of supporting shafts as has a minimum diameter and a center of said core member, a distance $L_1$ (mm) between the center of said core member and a surface of said intermediary transfer belt where toner image transfer occurs, wherein said intermediary transfer belt includes a coating layer coating said elastic layer, and wherein a thickness n ($\mu$m) of said coating layer, and an elongation p (%) of said coating layer when crack occurs in said coating layer when said coating layer having a predetermined size is pulled by predetermined force, satisfy:

$$L_1/r \leqq 0.026\ (p/n)^{1/2}.$$

25. An apparatus according to claim 24, wherein said coating layer has a thickness of 1–200 ($\mu$m).

26. An image forming apparatus according to claim 19, wherein the image bearing member is capable of bearing a plurality of color toner images, which are sequentially transferred and superimposed onto said intermediary transfer belt, and the color toner images are transferred onto a transfer material from said intermediary transfer belt.

27. A manufacturing method of an intermediary transfer belt comprising the steps of:

supporting a first elastic layer having a core member on a supporting member;

closely contacting a second elastic layer on an outer surface of the first elastic layer supported by said supporting process, and forming them into a cylinder member;

reversing an outer surface and an inner surface of said cylinder member to expose said first elastic layer to outside to provide an intermediary transfer belt for receiving a toner image from an image bearing member and transferring the toner image onto a transfer material therefrom.

28. A method according to claim 27, wherein said first elastic layer comprises rubber.

29. A method according to claim 28, wherein said first elastic layer is provided by immersing the core member in a rubber solution.

30. An method according to claim 27, wherein said second elastic layer comprises rubber.

31. A method according to claim 30, wherein in said close contact process, said rubber is contacted to said first elastic layer by vulcanization close contact.

32. A method according to claim 27, wherein said intermediary transfer belt is a seamless belt.

33. A method according to claim 27, wherein said core member is helically wound relative to the movement direction of said intermediary transfer belt.

34. A method according to claim 33, wherein said core member includes a thread.

35. A movable intermediary transfer belt extended around a plurality of supporting shafts, comprising:

a core member;

elastic layers sandwiching said core member, wherein a toner image on said intermediary transfer belt is transferred onto a transfer material;

wherein a distance r (mm) between a center of such one of said supporting shafts as has a minimum diameter and a center of said core member, a distance $L_1$ (mm) between the center of said core member and a surface of said intermediary transfer belt where toner image transfer occurs, a distance $L_2$ (mm) between a surface of said core member and the surface of said intermediary transfer belt wherein the toner image transfer occurs, and a size t (mm) of said core member measured in a direction perpendicular to a movement direction of said intermediary transfer belt, satisfy:

$$L_1 \leqq 0.1r, \text{ and}$$

$$0.5t \leqq L_2.$$

36. An intermediary transfer belt according to claim 35, wherein the minimum diameter is 6–100 (mm).

37. An intermediary transfer belt according to claim 35, wherein the thickness of said intermediary transfer belt is 0.2–3 (mm).

38. An intermediary transfer belt according to claim 35, wherein said core member has a thickness of 0.05–0.3 (mm) measured in a direction perpendicular to a movement direction of said intermediary transfer belt.

39. An intermediary transfer belt according to claim 38, wherein said core member is helically wound relative to the movement direction of said intermediary transfer belt.

40. An intermediary transfer belt according to claim 39, wherein said core member includes a thread.

41. An intermediary transfer belt according to claim 35, wherein said intermediary transfer belt includes a coating layer coating said elastic layer, and wherein a thickness n ($\mu$m) of said coating layer, and an elongation p (%) of said coating layer when a crack occurs in said coating layer when said coating layer having a predetermined size is pulled by predetermined force, satisfy:

$$L_1/r \leqq 0.026\ (p/n)^{1/2}.$$

42. An intermediary transfer belt according to claim 35, wherein the image bearing member is capable of bearing a plurality of color toner images, which are sequentially transferred and superimposed onto said intermediary transfer belt, and the color toner images are transferred onto a transfer material from said intermediary transfer belt.

43. A movable intermediary transfer belt extended around a plurality of supporting shafts, comprising:

a core member;

elastic layers sandwiching said core member, wherein a toner image on said intermediary transfer belt is transferred onto a transfer material;

wherein a distance r (mm) between a center of such one of supporting shafts as has a minimum diameter and a center of said core member, and a distance $L_1$ (mm) between the center of said core member and a surface of said intermediary transfer belt where toner image transfer occurs, satisfy:

$$0.025 \leqq L_1 \leqq 0.1r \leqq 5.3\ (\text{mm}).$$

44. An intermediary transfer belt according to claim 43, wherein the minimum diameter is 6–100 (mm).

45. An intermediary transfer belt according to claim 43, wherein the thickness of said intermediary transfer belt is 0.2–3 (mm).

46. An intermediary transfer belt according to claim 43, wherein said core member has a thickness of 0.05–0.3 (mm) measured in a direction perpendicular to a movement direction of said intermediary transfer belt.

47. An intermediary transfer belt according to claim 46, wherein said core member is helically wound relative to the movement direction of said intermediary transfer belt.

48. An intermediary transfer belt according to claim 47, wherein said core member includes a thread.

49. An intermediary transfer belt according to claim 43, wherein a distance $L_2$ (mm) between a surface of said core member and the surface of said intermediary transfer belt where the toner image transfer occurs, and a size t (mm) of said core member measured in a direction perpendicular to a movement direction of said intermediary transfer belt, satisfy:

$$0.025 \leqq 0.5t \leqq L_2 \leqq 2.95\ (\text{mm}).$$

50. An intermediary transfer belt according to claim 43, wherein said intermediary transfer belt includes a coating layer coating said elastic layer, and wherein a thickness n ($\mu$m) of said coating layer, and an elongation p (%) of said coating layer when crack occurs in said coating layer when said coating layer having a predetermined size is pulled by predetermined force, satisfy:

$$L_1/r \leqq 0.026\ (p/n)^{1/2}.$$

51. An intermediary transfer belt according to claim 50, wherein said coating layer has a thickness of 1–200 ($\mu$m).

52. An intermediary transfer belt according to claim 43, wherein the image bearing member is capable of bearing a plurality of color toner images, which are sequentially transferred and superimposed onto said intermediary transfer belt, and the color toner images are transferred onto a transfer material from said intermediary transfer belt.

53. A movable intermediary transfer belt extended around a plurality of supporting shafts, comprising:

a core member ;

elastic layers sandwiching said core member, wherein a toner image on said intermediary transfer belt is transferred onto a transfer materia;

a distance $L_2$ (mm) between a surface of said core member and the surface of said intermediary transfer belt where the toner image transfer occurs, and a size t (mm) of said core member measured in a direction perpendicular to a movement direction of said intermediary transfer belt, satisfy:

$$0.025 \leqq 0.5t \leqq L_2 \leqq 2.95\ (\text{mm}).$$

54. An intermediate transfer belt according to claim 53, wherein said intermediary transfer belt has a thickness of 0.2–3 (mm).

55. An intermediate transfer belt according to claim 53, wherein the thickness of said core member measured in a direction perpendicular to a movement direction of said intermediary transfer belt is 0.05–0.3 (mm).

56. An intermediary transfer belt according to claim 55, wherein said core member is helically wound relative to the movement direction of said intermediary transfer belt.

57. An intermediary transfer belt according to claim 56, wherein said core member includes a thread.

58. An intermediary transfer belt according to claim 53, wherein a distance r (mm) between a center of such one of supporting shafts as has a minimum diameter and a center of said core member, a distance $L_1$ (mm) between the center of said core member and a surface of said intermediary transfer belt where toner image transfer occurs, wherein said intermediary transfer belt includes a coating layer coating said elastic layer, and wherein a thickness n ($\mu$m) of said coating layer, and an elongation p (%) of said coating layer when crack occurs in said coating layer when said coating layer having a predetermined size is pulled by predetermined force, satisfy:

$$L_1/r \leqq 0.026\ (p/n)^{1/2}.$$

59. An intermediary transfer belt according to claim 58, wherein said coating layer has a thickness of 1–200 ($\mu$m).

60. An intermediary transfer belt according to claim 53, wherein the image bearing member is capable of bearing a plurality of color toner images, which are sequentially transferred and superimposed onto said intermediary transfer belt, and the color toner images are transferred onto a transfer material from said intermediary transfer belt.

* * * * *

UNITED STATES PATENT AND TRADEMARK OFFICE
CERTIFICATE OF CORRECTION

PATENT NO. : 5,995,793

DATED : November 30, 1999

INVENTOR(S): NAOKI ENOMOTO, ET AL.

It is certified that error appears in the above-identified patent and that said Letters Patent is hereby corrected as shown below:

COLUMN 5,
Line 29, "*he" should read --the--.

COLUMN 9,
Line 2, "satisfies," should read --satisfied,--;
Line 3, "$\{(L_1+r)/$" should read --$K=\{(L_1+r)/$--;
Line 53, "(4)." should read --(4').--; and
Line 63, after "$2.95 \geq L_2 \geq 0.5t \geq 0.025$ (mm)", insert --(5').--.

COLUMN 13,
Line 34, "comprising;" should read --comprising:--;
Line 44, "ot" should read --of--; and
Line 58, "$0.5t<L_2$." should read --$0.5t \leq L_2$.--.

COLUMN 16,
Line 18, "An" should read --a--.

UNITED STATES PATENT AND TRADEMARK OFFICE

CERTIFICATE OF CORRECTION

PATENT NO. : 5,995,793

DATED : November 30, 1999

INVENTOR(S): NAOKI ENOMOTO, ET AL.

It is certified that error appears in the above-identified patent and that said Letters Patent is hereby corrected as shown below:

COLUMN 18,
Line 14, "materia;" should read --material;--.

Signed and Sealed this

Fourteenth Day of November, 2000

*Attest:*

Q. TODD DICKINSON

*Attesting Officer*

*Director of Patents and Trademarks*